(12) United States Patent
Waas et al.

(10) Patent No.: US 10,594,779 B2
(45) Date of Patent: Mar. 17, 2020

(54) METHOD AND SYSTEM FOR WORKLOAD MANAGEMENT FOR DATA MANAGEMENT SYSTEMS

(71) Applicant: DATOMETRY, INC., San Francisco, CA (US)

(72) Inventors: Florian Michael Waas, San Francisco, CA (US); Mohamed Soliman, Foster City, CA (US); Zhongxian Gu, Sunnyvale, CA (US); Lyublena Rosenova Antova, Sunnyvale, CA (US); Tuan Anh Cao, San Francisco, CA (US); Entong Shen, Foster City, CA (US); Michael Alexander Duller, San Francisco, CA (US)

(73) Assignee: DATOMETRY, INC., San Francisco, CA (US)

( * ) Notice: Subject to any disclaimer, the term of this patent is extended or adjusted under 35 U.S.C. 154(b) by 175 days.

(21) Appl. No.: 15/250,887

(22) Filed: Aug. 29, 2016

(65) Prior Publication Data
US 2017/0063936 A1    Mar. 2, 2017

Related U.S. Application Data

(60) Provisional application No. 62/210,896, filed on Aug. 27, 2015.

(51) Int. Cl.
*H04L 29/08* (2006.01)
*H04L 12/911* (2013.01)

(52) U.S. Cl.
CPC .......... *H04L 67/1002* (2013.01); *H04L 47/70* (2013.01); *H04L 67/141* (2013.01)

(58) Field of Classification Search
CPC ... H04L 63/08; H04L 63/205; H04L 63/0227; H04L 67/1002; H04L 67/1008; G06F 17/30545; G06F 17/30377; G06F 17/30132; G06F 16/172; G06F 16/2308; G06F 16/2379; G06F 16/2453; G06F 16/2471
(Continued)

(56) References Cited

U.S. PATENT DOCUMENTS 7,123,608 B1 * 10/2006  Scott ................... H04M 3/2218
                                                          370/353
7,693,913 B2    4/2010  Goto
(Continued)

OTHER PUBLICATIONS

Aleyasen, A., et al., "High-Throughput Adaptive Data Virtualization via Context-Aware Query Routing," 2018 IEEE International Conference on Big Data, Dec. 2018, 10 pages.
(Continued)

*Primary Examiner* — James N Fiorillo
(74) *Attorney, Agent, or Firm* — Adeli LLP

(57) ABSTRACT

A system for controlling access to a downstream database management system (DMS) is provided. The system comprises an interface to maintain client connections with a plurality of upstream clients; a pooling component to establish a dynamic pool, and to selectively route each client connection to a pool; within each pool maintaining a queue comprising client database requests associated with particular client connections; and selectively granting access to the client database requests within each queue to at least one downstream DMS.

23 Claims, 5 Drawing Sheets

(58) Field of Classification Search
USPC .................. 709/203, 225, 201, 227; 707/611
See application file for complete search history.

(56) References Cited

U.S. PATENT DOCUMENTS

| | | | | |
|---|---|---|---|---|
| 8,015,233 | B2* | 9/2011 | Li | H04L 61/1552 707/607 |
| 8,943,181 | B2* | 1/2015 | Kasten | H04L 67/1008 709/223 |
| 9,208,032 | B1* | 12/2015 | McAlister | G06F 11/1435 |
| 2004/0122953 | A1* | 6/2004 | Kalmuk | G06F 16/2308 709/227 |
| 2006/0242297 | A1* | 10/2006 | Aronoff | H04L 29/06 709/225 |
| 2007/0061266 | A1* | 3/2007 | Moore | G06Q 50/00 705/51 |
| 2007/0136311 | A1* | 6/2007 | Kasten | H04L 67/1008 |
| 2009/0059785 | A1* | 3/2009 | Jogalekar | H04L 47/10 370/230 |
| 2010/0169377 | A1 | 7/2010 | Galeazzi et al. | |
| 2011/0154461 | A1* | 6/2011 | Anderson | H04L 63/0227 726/7 |
| 2011/0276623 | A1* | 11/2011 | Girbal | G06F 16/172 709/203 |
| 2012/0036146 | A1* | 2/2012 | Annapragada | G06F 16/2471 707/764 |
| 2012/0158650 | A1* | 6/2012 | Andre | G06F 16/24539 707/611 |
| 2012/0179677 | A1* | 7/2012 | Roselli | G06Q 10/10 707/736 |
| 2013/0311729 | A1* | 11/2013 | Navarro | G06F 12/00 711/154 |
| 2014/0325096 | A1* | 10/2014 | Jung | G06F 13/126 710/16 |
| 2015/0172206 | A1* | 6/2015 | Anderson | H04L 47/70 709/226 |
| 2016/0261576 | A1* | 9/2016 | Nivala | H04L 63/08 |
| 2016/0321097 | A1* | 11/2016 | Zhu | G06F 9/45558 |
| 2017/0034095 | A1* | 2/2017 | Kamalakantha | G06F 21/6227 |
| 2017/0249353 | A1* | 8/2017 | van Gulik | G06F 16/2379 |

OTHER PUBLICATIONS

Zhang, Mingyi, et al., "Workload Management in Database Management Systems: A Taxonomy," TKDE 2017, Month Unknown, 2017, 18 pages, IEEE.

* cited by examiner

METHOD AND SYSTEM FOR WORKLOAD MANAGEMENT FOR DATA MANAGEMENT SYSTEMS This application claims the benefit of priority to U.S. Provisional Patent Application No. 62/210,896 filed on Aug. 27, 2015, and entitled METHOD AND SYSTEM FOR WORKLOAD MANAGEMENT FOR DATA MANAGEMENT SYSTEMS", which incorporated herein by reference.

FIELD

Embodiments of the present invention relate to database systems.

BACKGROUND

Database management systems may be configured to serve as multiple clients. Each client typically maintains a connection to a particular database management system, and database requests are sent over said connection for processing by the database management system. Each database management system may be configured to support a maximum number of simultaneous client connections. If the maximum number of concurrent client connections is exceeded, then a request for a new client connection will be denied.

SUMMARY

Invention is enterprise software that manages workloads submitted by client applications to one or more data management systems ("DMS"), such as a relational database management system. Invention increases scalability and availability of the data management systems by providing detailed admission policies, scheduling primitives, and means of control for resource consumption.

In one embodiment, the invention can be used to achieve virtual scalability in a DMS with hard-coded limit on the number of concurrent connections. When a large number of concurrent connection requests are attempted to DMS, the DMS might refuse accepting new connections if the number of already accepted connections has reached the hard-coded limit. This could result in clients unsuccessfully attempting to re-connect to the DMS. The invention is used to virtually allow a large number of concurrent client connections to access the DMS, beyond what the DMS typically permits. This is enabled by pooling a large number of incoming client connections into multiple pools, while using a smaller number of outgoing physical connections to actually communicate with the DMS. Each pool has a backlog of client Requests received from different clients. After processing a given Request is complete, a Request from the backlog is granted access to the DMS. From client-side perspective, a large number of concurrent clients are allowed to access the DMS, while from the DMS perspective, the limit on the number of concurrent connections is still enforced even though the actual Requests might belong to a number of clients exceeding the DMS concurrency limits.

In one embodiment, the invention can be used to achieve workload balancing across replicas of the same DMS. A connection pool is configured to route incoming traffic to a gateway replica in a cluster of replicas. The invention maintains active connections to the different gateways representing the replicas in the cluster. When a Request is received, a particular replica can be chosen based on different criteria including round-robin and random choice criteria. For example, if a random choice criterion is used, a replica is chosen at random each time to process a Request received from a given client. This achieves load balancing across replicas by randomly distributing the client workload across different DMS instances.

In one embodiment, the invention is configured to route client Requests to different DMS replicas while adapting to workload and client characteristics. For example, Requests could be routed based on client address, geographical location, client priority and type of Request. For example, Requests in a transactional workload typically require small processing times. These requests could be routed to replicas with limited processing power. On the other hand, Requests with deep analytical operations typically require heavy processing. There Requests are routed to replicas with more processing power.

In one embodiment, the invention is used to achieve fault tolerance in read-only DMS replicas, when the DMS lacks fault tolerance capabilities. When a connection pool is configured to route traffic to a DMS replica in a cluster of replicas, the invention detects that the connection to a particular replica has failed because of replica failure (e.g., disk failure or network inaccessibility). The invention automatically excludes the failed replicas from processing any further Requests. Other configured replicas in the cluster are used to substitute the failed replica. A stand-by replica could also be used to replace the failing replica.

In one embodiment, the invention allows system administrators to monitor the status of different connection pools and DMS gateways. This includes getting information and aggregated statistics on the number of active connections, size of backlogs, long-lived client Requests, average processing time in each DMS instance. Performance analysis of DMS instances and flagging potential bottlenecks are possible based on this information. For example, system administrators can detect that the average Request processing time of a particular DMS instance is too large, and hence choose to replicate the instance by adding one or more additional instances to achieve better load balancing and response times.

In one embodiment, the invention allows system administrators to gain exclusive access to the DMS for maintenance purposes. The invention is configured to route all administrator Requests through a special pool with exclusive access rights on the DMS gateway system. This guarantees all client connections are idle for the duration of processing a given administrator Request. This allows maintenance and management requests to be processed while other client requests are queued without affecting the availability of the DMS. The clients do not lose their active connections to the DMS. The DMS becomes virtually available and it responds to clients Requests as soon as the ongoing administrator Request is complete.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features.

Accordingly, this description of the invention is set forth without any loss of generality to, and without imposing limitations upon, the invention.

Broadly, embodiments of the present invention disclose techniques and systems controlling access to database management system (DMS).

Figure 1:
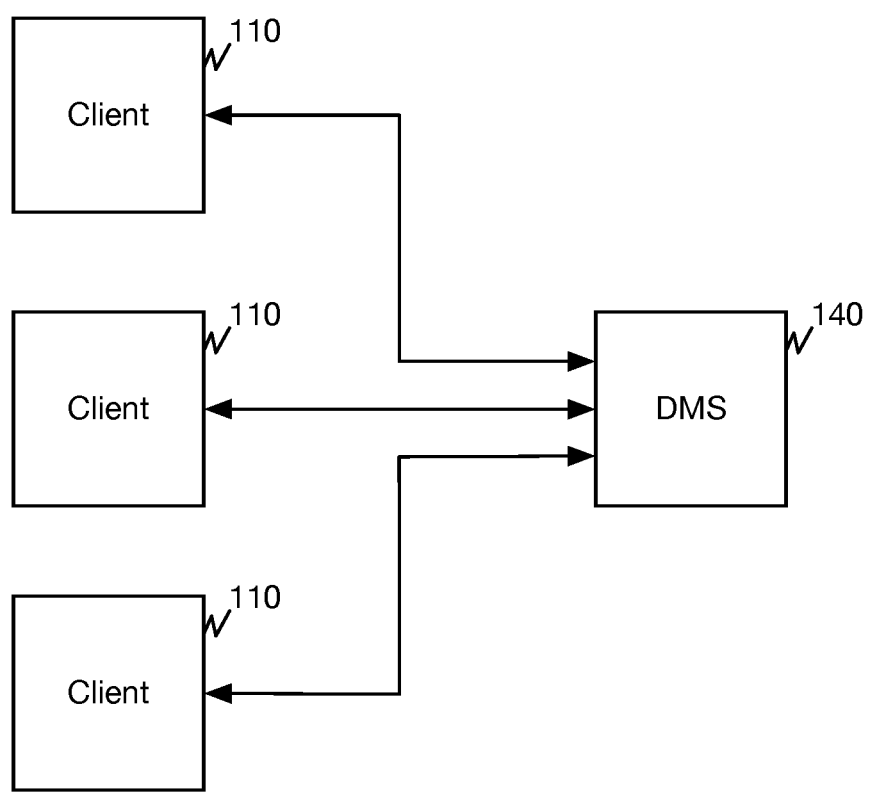
FIG. 1 schematically illustrates how clients typically connect to a database management system (DMS).

Before describing the invention, it may be useful to review some basic concepts around the deployment of applications and data management systems as outlined in FIG. 1.

A client application ("Client") (110) establishes one or more connections with DMS (140) and communicates a workload consisting of commands ("Request") to DMS, then receives data messages ("Result") that it process. After processing of the workload is complete, the client shuts down the connection. Depending on the application logic, the workload can be an individual command or, more typically, a sequence of commands. If the workload consists of multiple commands, the session is considered "idle" between the time results for one command are returned and a new request is submitted.

The establishing of a connection as well as the subsequent communication may be conducted using connector libraries typically provided by the vendor of DMS or third parties. Typical, embodiments of such connectors are OBDC or JDBC libraries.

In the following, the term "Client" is used in a generic way to encompass a wide variety of different client applications; client applications may differ in workloads submitted, results consumed, etc.

In the section "Application Scenarios" a variety of problems arising from this way of deploying Client and DMS are illustrated in detail.

Figure 2:
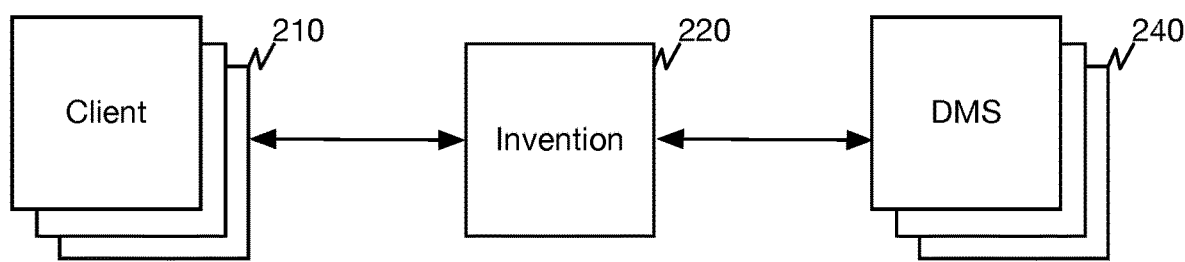
FIG. 2 shows a deployment scenario where claims connect to a DMS via an intermediate workload manager (Invention), in accordance with one embodiment of the invention.

In contrast, FIG. 2 depicts a deployment of DMS and instances of Client using the invention. Instances of Client (210) now connect to the Invention (220) instead of DMS (240), and Invention connects to DMS. Invention manages connection and workload requests as detailed below. Section "Application Scenarios" illustrates various use cases and their benefits.

Figure 3:
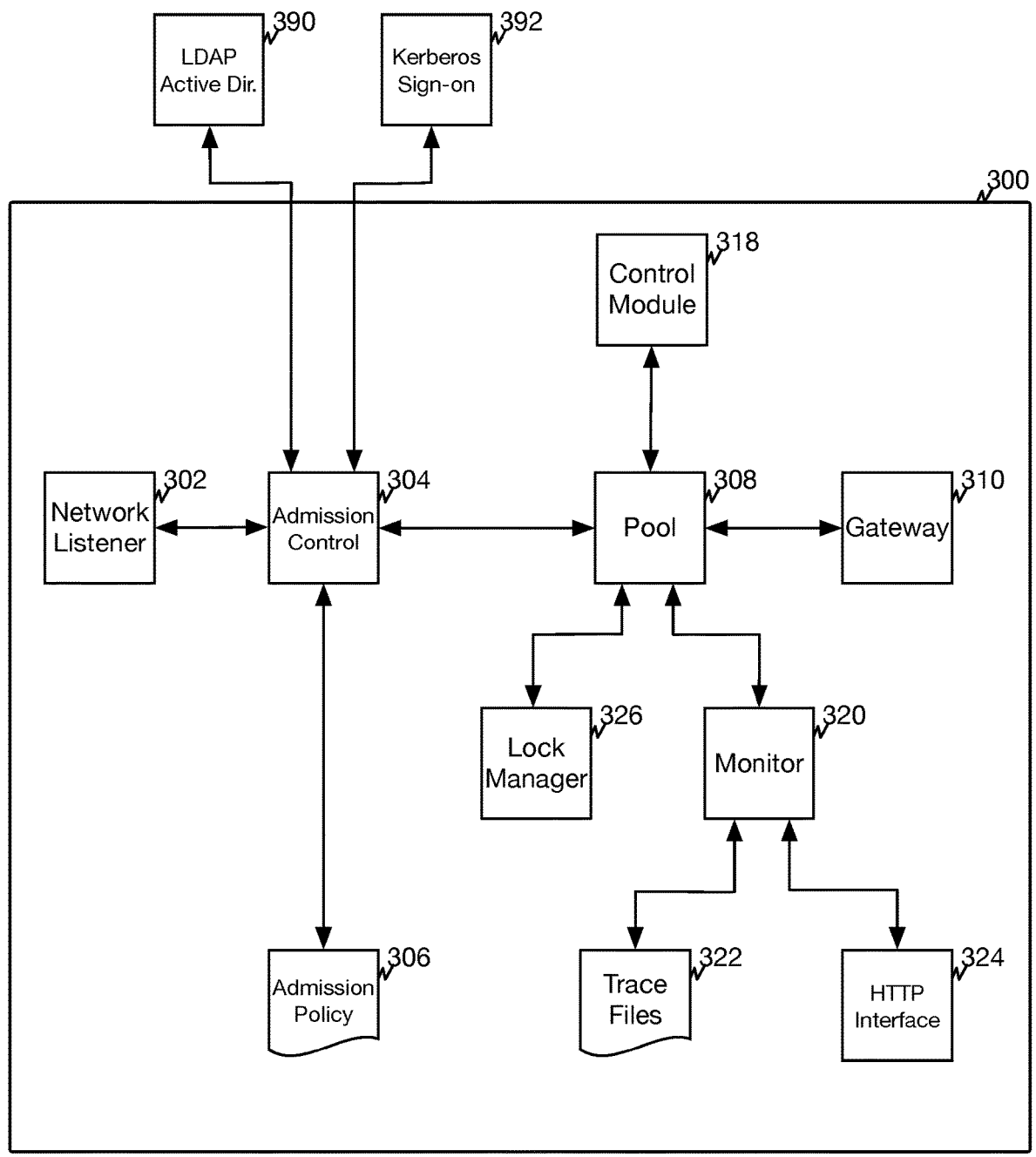
FIG. 3 shows a high-level block diagram of the components of the inventive workload manager, in accordance with one embodiment.

FIG. 3 is a diagram illustrating an embodiment of Invention (300). It consists of the following components. Network Listener (302) that accepts incoming connection requests using standard network protocols, such as TCP/IP. Network Listener routes the connection to a module ("Admission Control") (304) that selects and applies a policy ("Admission Policy") (306) to determine (i) the method of authentication used for the connection, and (ii) the resource pool ("Pool") and gateway ("Gateway") to be used in routing the connection.

Admission Policy is selected based on a number of criteria (306) that may include any of the following: (i) identity of user of incoming request, i.e., login; (ii) database or data container Client wants to connect to; (iii) IP address where connection request was originated from, including masking of the IP address to consider only parts of the address; (iv) name of the application; variety of other criteria based on parameters transmitted at the time of the connection request may be used to select Admission Policy.

The validity of Admission Policy can be either general, i.e., always valid, or limited by ranges or patterns of dates and/or times.

Admission Control may be configured to perform authentication, including (i) authentication via locally stored passwords using standard encryption such as SHA-1, MD5, etc., (ii) integrated security in the form of LDAP (390), including Active Directory, or (iii) Single-Sign On (392) using Kerberos or (iv) other standard authentication protocols.

Invention manages one, or more typically, a multitude of pools (308). Pool controls the number of concurrent connections from Invention to DMS as well as the traffic transmitted over these connections at any given time. Routing incoming connections to different pools effectively divvies up DMS's resource bandwidth between different groups of connections, establishes priorities between different instances of Client, and accomplishes scalability, availability and traffic optimization objectives as detailed in "Application Scenarios" below. Pool also controls life-cycle management of connections through timeouts concerning idle sessions and active transactions, see Workflow details below.

Pool is characterized by (i) the number of concurrent connections an instance of Pool permits to DMS ("Capacity"), (ii) number of concurrently active statements ("Active Slots"), usually significantly lower than Capacity, and (iii) number of connection requests that are waitlisted ("Backlog").

Pool routes the connection request and subsequent commands to Gateway (310) that specifies the connection parameters for the connection to the DMS.

Control Module (318) provides a means to administrators to affect Pool or Connection via language extensions ("Control Language") to terminate, pause, and activate Connection or Pool. Control Language contains also language primitives for modifying any configuration detail in the system including configuration details of Pool, number and configuration details of Policy, number and configuration details of Gateway, etc.

Tracing facility (320) monitors Connection and makes detailed observations available for external consumption via files (322), HTML over HTTP (324) or other formats. Observations include timing of individual steps of progress of Connection such as time when request was received, time spent waiting for admission to Pool, full transcript of Request, time Request was submitted to DMS, time when first data of Result was received, time Request was completed successfully, or error received, etc.

Lock Manager (326) provides means to acquire shared/exclusive locks on any resource in Invention, including locks for mutually exclusive or shared access ("Access Lock") to DMS gateways, see below for details.

Detailed Control Flow

Figure 4:
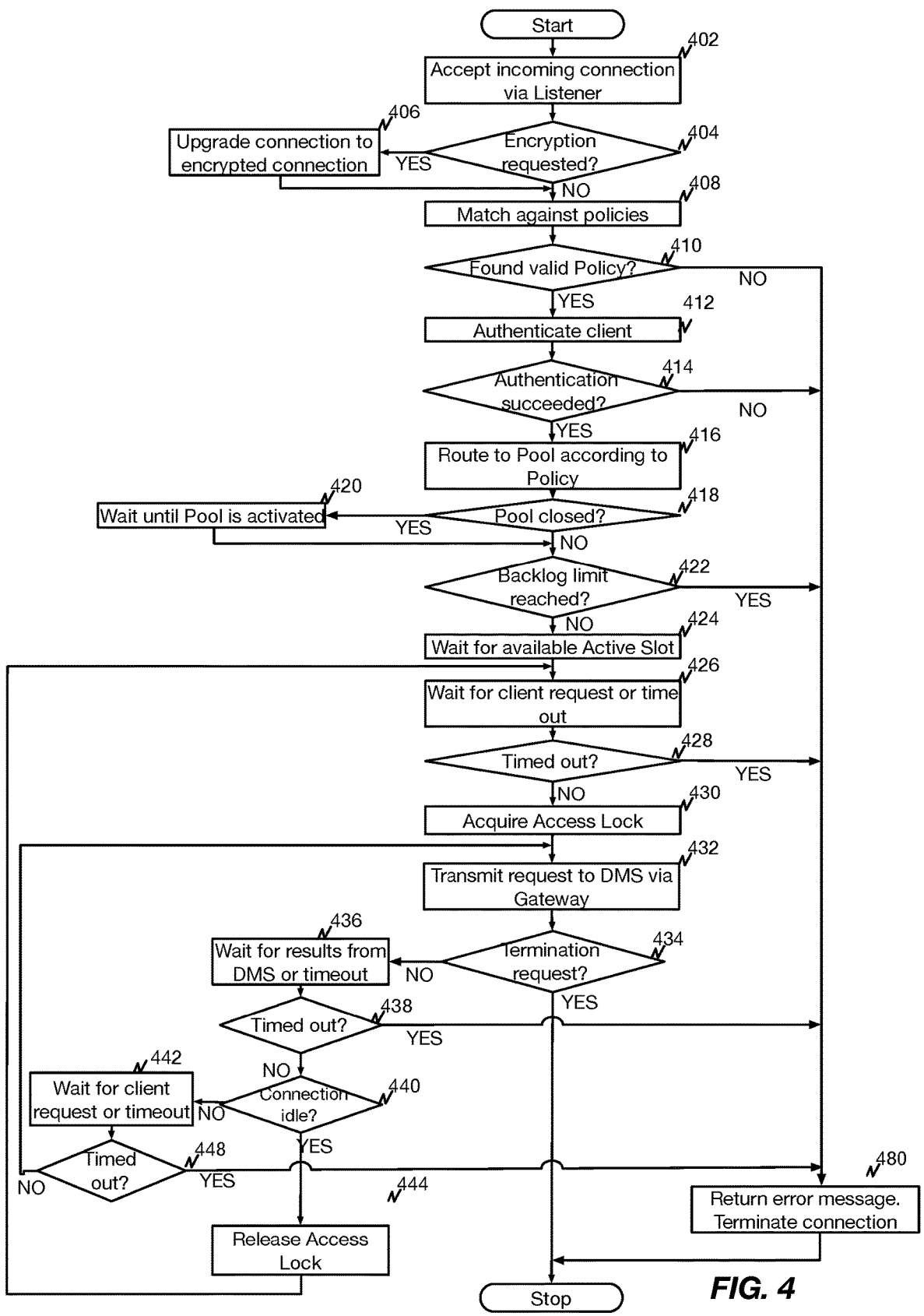
FIG. 4 shows a flowchart of how connections and establishing commands processed, in accordance with one embodiment of the invention.

The following describes how connections are established and commands are processed as detailed in flowchart in FIG. 4.

Invention accepts incoming connection request (402) via standard network protocol such as TCP/IP using Network Listener (302). If client requests connection to be encrypted (404), Connection is upgraded (406) using any standard encryption technology such as Transport Layer Security (TLS) or Secure Sockets Layer (SSL).

Connection is then matched against available policies (408) using a variety of criteria as discussed above. Policies are matched in priority order as defined by the administrator. The first matching policy ("Policy") is used. If no policy matches the search criteria (410) an error message is returned to the client and the connection is terminated (480).

Based on Policy, an authentication method is determined and Client is either directly authenticated or, in case of pass-through authentication, authentication is deferred to DMS once connection is established (412). If immediate authentication is required according to Policy but does not succeed (414), an appropriate error message is returned to Client and Connection is terminated (480).

Otherwise, Policy determines Pool through which all communication will be conducted (416). If Pool is closed, i.e., does not accept new connections at this time (418) Connection is held in waiting pattern until Pool is activated again (420). If the limit on Backlog, as configured by administrator, is reached (422) appropriate error message is returned to Client and Connection is terminated (480).

Otherwise, Connection waits for Active Slot to become available (424). Connection waits for first request from Client or timeout to occur (426). If timeout occurred (428), appropriate error message is returned to Client and Connection is terminated (480).

Otherwise, Access Lock is acquired (430). Once granted, Request is transmitted to DMS via Gateway (432). If Request is a request to terminate Connection (434), indicating the end of the workload, Connection is shut down and workflow terminates.

Otherwise, Connection waits for Result and forwards it on to Client (436). If Result is not completely received within a configured timeout (438), appropriate error message is returned to Client and Connection is terminated (480).

Otherwise, if Connection is idle (440), i.e., no transactions are pending, Access Lock is released (444) and control flow continues with waiting for client requests (426).

If Connection is not idle (440), Access Lock remains held and Connection waits for next request from Client (442). If timeout occurred (448), appropriate error message is returned to Client and Connection is terminated (480). Otherwise, control flow continues at (432).

Instead of terminating the connection from Invention to DMS, Invention may retain unused connections and re-use them later in order to avoid a potential time penalty for establishing and destroying of connections to DMS.

Application Scenarios

The following are detailed descriptions of application scenarios that exemplify how an embodiment of the invention can be used. The scenarios are chosen to each illustrate a specific scenario. In practice the scenarios presented will widely overlap.

Scenario 1: Scalable Connection Management

Typically, a multitude of clients may connect simultaneously to DMS. As DMS has only limited resources such as memory, CPU capacity, I/O bandwidth, etc. the system's performance declines with increasing number of simultaneous connections. Depending on the types of requests, i.e., the workloads of individual clients, the DMS's resources may get depleted to the point where new connections cannot be made and existing workloads cannot finish or finish within reasonable time. In this situation, the system is considered unavailable or "down" with severe ramifications for the users: applications are denied access and business processes are disrupted, existing connections to the database may get starved of resources and prevented from making any progress, and even a restart of the entire DMS may be needed, requiring significant intervention from IT staff. Typically, the maximum number of connections presents a hard limit that is configured at system start in DMS. It is generally desirable to keep the limit on concurrent connections low-typically in the low hundreds—to avoid wasting resources such as memory unnecessarily and take into account limitation of the system's scalability. Depending on the characteristics of the workloads it may be desirable to have no more than a fraction of the connections submit concurrently requests to be processed in parallel. As the number of connections cannot be controlled by the DMS or operators of the DMS but depends solely on the number of clients or applications the lack of control and the prospect of system failures in case of overload render the DMS as unstable or lacking in robustness.

Using Invention makes operating applications and DMS scalable and safe as follows. The maximum number of connections DMS is configured to handle is not reached nor can it be exceeded. Even when a large number of connection attempts are submitted to Invention no connections are refused and processing in Client is not interrupted or disturbed. The number of truly concurrently submitted requests is controlled by the capacity of Access Lock. This gives administrators fine-grain control over the degree of actual concurrency of processing in DMS, yet, makes DMS appear scalable and available at any point in time.

Scenario 2: Virtual Single-User Mode for Maintenance Operations

A number of maintenance operations in DMS require that no instance of Client is performing concurrent operations, i.e., all connections be idle. This is typically accomplished by shutting down DMS and restarting it in a restricted mode that allows only a single user to connect. This makes DMS only accessible to the administrator to perform the maintenance operation. Once the operation is complete, DMS is shut down again and restarted in regular multi-user mode.

By configuring (i) a pool through which administrator connections are routed and (ii) Access Lock to offer exclusive access for this pool, Invention implements a admission control mechanism, that enables administrator to gain exclusive access with the guarantee that any concurrent connection is idle for the duration of any operation submitted via the administrator pool ("Virtual Single-user Mode"). As a result, the management operations can be executed, even though they require restricted access, without compromising the overall availability of the system or causing disruption to clients and business processes.

Scenario 3: Tracing and Auditing

Pool may be configured to retain detailed information about timing of event at a finer resolution than workload, i.e., times of individual messages being exchanged between Client and DMS. Timing and authentication information is made available for external consumption through files or API's such as HTTP. The information logged can serve as audit information detailing exact information about the requester and nature and content of individual requests. Another use case for the information is detailed analysis of the performance characteristics of DMS typically used for trouble-shooting and sizing and capacity planning of DMS. Timing information includes time of arrival of requests, identity of application or user, content of request, time request is queued in Invention, time request is submitted to DMS, time first results are obtained, time request is complete or encountered error condition, etc.

Scenario 4: Multi-DMS Routing and Load-Balancing

It is often desirable to route connections to different copies of DMS for purposes of load-balancing or isolating of workloads. Pool can be configured to route connections to different gateways based on a multitude of criteria such as round-robin or based on load profiles of individual DMS instances. Typical configurations include routing of all write access to one instance and routing of all read-only access across a cluster of replicas.

To enhance understanding of the present invention, consider the example of an insurance company operating globally that maintains insurance and claims data in a DMS. The data is accessed by a large number of client applications across all departments. During a typical business day, claims data is reported by field agents, rates and pricing is requested by sales representatives, and regulatory reporting is performed at the end of the business day. Clients' interaction with the DMS is executed through applications that connect to the DMS, run on or more database queries or update existing records, then terminate the connection. A typical connection may last anywhere from seconds to hours, the actual queries or commands are usually in the order of seconds. In addition, a variety of user groups such as executives that access the DMS occasionally—but at high priority—during planning or board meetings exist across the enterprise. For the above example, the following use cases may be realized:

1. Traffic Management

The DMS is provisioned to accommodate a certain capacity of concurrent connections, e.g., 200 connections. However, during a surge pattern such as a natural disaster, the number of requests to file claims and/or check insurance policies may exceed regular traffic by a multiple. As a result, client applications may crash or error out and show behavior similar to that of an overloaded wireless telephone network: repeated connection attempts only increases the contention on the DMS but actual throughput is often diminished. In extreme cases, the DMS my run out of resources and shut down completely leading to catastrophic results at the business level.

Using Invention, incoming connection request are queued until capacity on the DMS frees up and first-come-first-served order is preserved. Applications do not crash or error out, instead may experience short delays but are fully functional.

2. Priority Routing

During certain days of the week as well as certain times of the day, overall workload may be heavier than at other times leading to generally slower response times.

Using Invention groups of applications or users can be assigned different priorities, e.g., connection requests by executives can be given priority over other requests.

3. Load-Balancing

To overcome throughput limitations of a DMS, multiple replicas with identical data loaded may be used. Invention can load-balance between the different systems according to different policies including round-robin where the next incoming connection is assigned to the next DMS according to a predefined sequence, or uniform balancing where connections are assigned a DMS chosen randomly. Round-robin is generally considered a fair scheduling tactic, however, uniform distribution may outperform round-robin as it is not susceptible to accidental traffic patterns that might end up taxing one instance harder than others.

4. Data Sharding—Access Policy

In many areas of business, including the insurance business, regulation requires certain information to be retained within the country of business, e.g., data about insurance policies sold in Germany must not be stored or processed outside of Germany. Therefore, the company must maintain data centers with separate DMS's for different geographies. Invention may be configured to route connections according to their country of origin to the appropriate DMS. This simplifies the setup of the client applications and avoids that clients accidentally, or willfully, access data that is outside of the corresponding jurisdiction.

5. Data Sharding—Performance Optimization

For an additional scenario for sharding consider departmental policies where certain user groups have different performance requirements when accessing data. For example, insurance agents who access the DMS concurrently need up-to-date pricing to present customers with appropriate quotes. End of day reporting for regulatory purposes, however, requires consolidated data and is accessed only by a few controllers. This presents an cost optimization opportunity for IT: by using Invention, agents' request can be routed to a high-performance/high-throughput instance of DMS, whereas end-of-day reporting is routed to a much more cost-effective replica of the DMS.

6. Operations and Maintenance

Occasionally, the DMS may need to be taken off-line for emergency maintenance such as replacement of hardware, restart after power failure, etc. Some of these operations require that no user connections are currently active on the DMS, others may require complete shutdown and restart of the DMS. Invention enables queuing and buffering of incoming request so DMS can be taken off-line, maintained, and restarted without affecting users' applications. Even complete shutdown and restart of the underlying DMS which may take 10's of seconds does not result in interruptions of clients' connections.

Besides operational benefits such as enhanced throughput or up-time, Invention's benefits extend also to the client applications: Using Invention, a single-system view is preserved, i.e., client applications are unaware of the different underlying systems but connect to only one central point that is Invention. The benefit of a single-system view is the decoupling of front-office, i.e., client applications and back-office, i.e., IT department: the additional flexibility allows both sides to deploy software more flexibly because changes on either side do not require re-wiring/re-configuration of systems but are mitigated and optimized by Invention.

Invention can be used to supplement an existing DMS with workload management and extends workload management capability across multiple instances of a DMS. Invention enhances the scalability of a DMS often by a significant multiple of what DMS provides natively. By boosting the availability of DMS through Virtual Single-user Mode or temporary closure of pools, DMS—which would otherwise not be considered highly available—can now be used in mission-critical application scenarios. In addition, Invention provides a wide array of utilities and mechanisms to simplify deployment of applications and DMS by (i) giving administrators better visibility into traffic and traffic patterns between Client and DMS, and (ii) providing controls that put administrators in charge.

Figure 5:
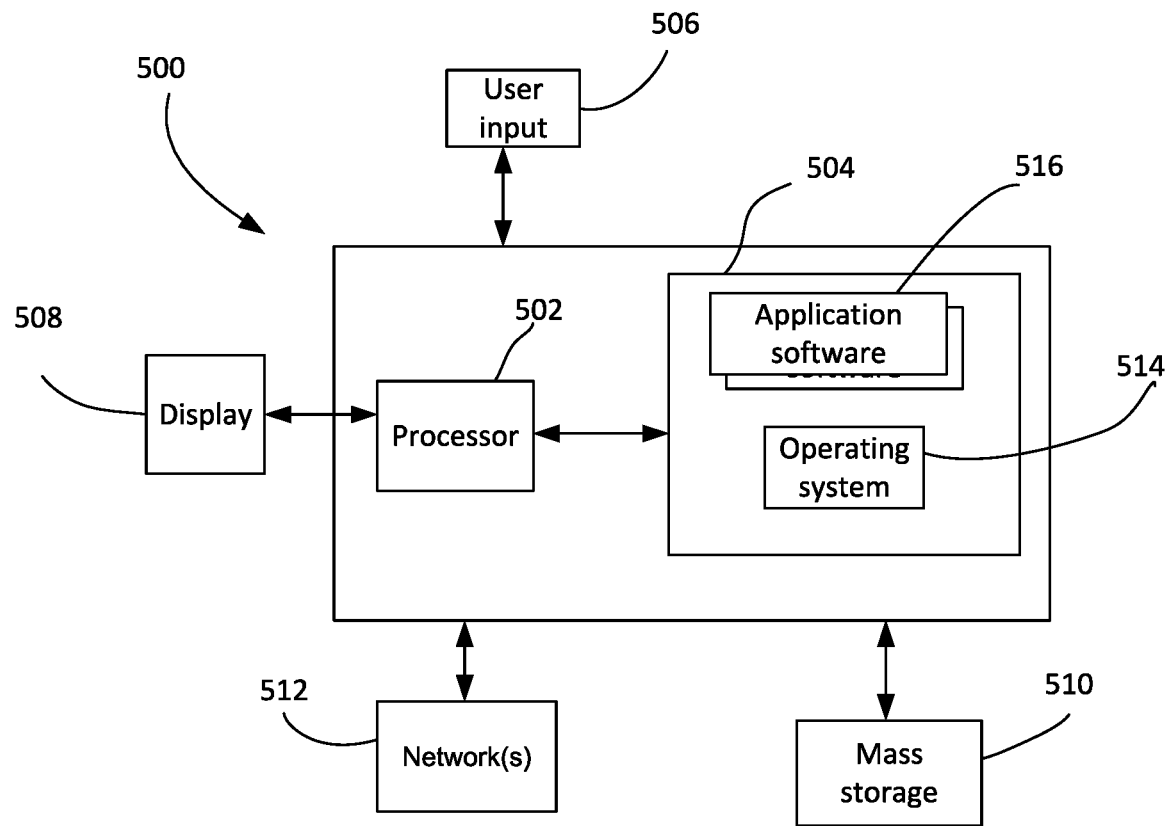
FIG. 5 shows a high-level block diagram of exemplary hardware that may be used to implement workload manager, in accordance with one embodiment.

FIG. 5 shows an example of hardware 800 that may be used to implement Invention, in accordance with one embodiment. The hardware 500 may include at least one processor 502 coupled to a memory 504. The processor 502 may represent one or more processors (e.g., microprocessors), and the memory 504 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 504 may be considered to include memory storage physically located elsewhere in the hardware, e.g. any cache memory in the processor 502, as well as any storage capacity used as a virtual memory, e.g., as stored on a mass storage device.

The hardware also typically receives a number of inputs and outputs for communicating information externally. For interface with a user or operator, the hardware may include one or more user input devices 506 (e.g., a keyboard, mouse, etc.) and a display 508. For additional storage, the hardware 800 may also include one or more mass storage devices 510, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 512 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 712 and each of the components, as is well known in the art.

The hardware 500 operates under the control of an operating system 514, and executes application software 816 which includes various computer software applications, components, programs, objects, modules, etc. to perform the techniques described above.

In general, the routines executed to implement the embodiments of Invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for sharing a limited number of database connections with a larger number of clients, the method comprising:
   maintaining a plurality of incoming connections from a plurality of clients for a plurality of databases;
   defining a plurality of queuing pools, each queuing pool associated with a database and providing one or more outgoing connections to the associated database;
   based on a set of admissions policies that associate each queuing pool with a set of criteria to match to the incoming connections, selecting a queuing pool to assign each incoming connection; and
   within a particular queuing pool selected for at least two different incoming connections from at least two different clients and a particular database,
      storing requests that are for the particular database and that are received from the two different clients through the two different incoming connections; and
      forwarding the stored requests through two concurrent outgoing connections to the particular database for processing,
   wherein the particular queuing pool limits a number of concurrent connections to its associated database to a maximum number, wherein a number of incoming connections assigned to the particular queuing pool is greater than the maximum number, wherein a number of concurrent outgoing connections from the particular queuing pool to the associated database is smaller than the maximum number.

2. The method of claim 1, wherein two or more of the database connections are to different replicas of the particular database, wherein the different replicas of the particular database are associated with different queuing pools.

3. The method of claim 2, wherein the admission policies comprise workload balancing criteria for the different replicas of the particular database.

4. The method of claim 3, wherein said workload balancing criteria comprise criteria to randomly select different queuing pools for different database replicas.

5. The method of claim 3, wherein said workload balancing criteria comprise criteria to select different queuing pools for different database replicas on a round robin basis.

6. The method of claim 3, wherein said workload balancing criteria comprises criteria for selecting a queuing pool for a database replica based on at least one of a client address, a geographical location, a client priority, and a type associated with the received request.

7. The method of claim 2 further comprising providing a mechanism to detect an operational state associated with each database replica.

8. The method of claim 7 further comprising excluding any non-operational database replicas from said workload balancing.

9. The method of claim 1, wherein selecting a queuing pool to assign each incoming connection comprises:
determining that a specific queuing pool selected for a particular incoming connection is closed and not accepting new incoming connections;
maintaining the particular incoming connection until the specific queuing pool is reopened and again accepting new connections; and
assigning the particular incoming connection to the reopened specific queuing pool.

10. The method of claim 9 further comprising providing a tracing component to monitor aspects of different connections between different pairs of queuing pools and databases.

11. The method of claim 10, wherein said aspects comprise times at which requests are received, time durations waiting for admission to queuing pools, transcripts of the requests, times at which data values are initially received from the databases for requests, and times at which data values are received from the databases to complete client requests.

12. The method of claim 9 further comprising terminating the particular incoming connection when a reply from a specific database associated with the specific queuing pool is not received for a particular client request within a particular period of time.

13. The method of claim 1, wherein forwarding the stored requests through two concurrent outgoing connections to the particular database for processing comprises:
determining that the particular queuing pool has no outgoing connection available;
waiting until an outgoing connection is available; and
forwarding the stored requests through the available outgoing connection.

14. The method of claim 1, wherein the set of criteria comprises at least one of a user identifier for a user associated with a new connection, a database identifier for a database targeted by the new connection, an IP address of the connection, an application identifier for an application initiating the new connection, and a period of time.

15. The method of claim 1 further comprising providing a control module to allow administrators to configure (i) a first number of concurrent connections each queuing pool permits to its associated database, (ii) a second number of concurrent outgoing connections from each queuing pool to its associated database, and (iii) a third number of incoming connections to maintain for assigning to the queuing pools.

16. The method of claim 1 further comprising selecting the particular queuing pool for requests during maintenance operations.

17. A non-transitory machine readable medium storing a program which when executed on set of processing units of a host computer shares a limited number of databases with a larger number of clients, the program comprising sets of instructions for:
maintaining a plurality of incoming connections from a plurality of clients for a plurality of databases;
defining a plurality of queuing pools, each queuing pool associated with a database and providing one or more outgoing connections to the associated database;
based on a set of admissions policies that associate each queuing pool with a set of criteria to match to the incoming connections, selecting a queuing pool to assign each incoming connection; and
within a particular queuing pool selected for at least two different incoming connections from at least two different clients and a particular database,
storing requests that are for the particular database and that are received from the two different clients through the two different incoming connections; and
forwarding the stored requests through two concurrent outgoing connections to the particular database for processing,
wherein the particular queuing pool limits a number of concurrent connections to its associated database to a maximum number, wherein a number of incoming connections assigned to the particular queuing pool is greater than the maximum number, wherein a number of concurrent outgoing connections from the particular queuing pool to the associated database is smaller than the maximum number.

18. The non-transitory machine readable medium of claim 17, wherein the set of instructions for selecting a queuing pool to assign each incoming connection comprises sets of instructions for:
determining that a specific queuing pool selected for a particular incoming connection is closed and not accepting new incoming connections;
maintaining the particular incoming connection until the specific queuing pool is reopened and again accepting new connections; and
assigning the particular incoming connection to the reopened specific queuing pool.

19. The non-transitory machine readable medium of claim 18, wherein the set of criteria comprises at least one of a user identifier for a user associated with a new connection, a database identifier for a database targeted by the new connection, an IP address of the connection, an application identifier for an application initiating the new connection, and a period of time.

20. The non-transitory machine readable medium of claim 17, wherein two or more of the database connections are to different replicas of the particular database, wherein the different replicas of the particular database are associated with different queuing pools, wherein the admission policies comprise workload balancing criteria for the different replicas of the particular database.

21. The non-transitory machine readable medium of claim 20, wherein said workload balancing criteria comprises criteria for selecting a queuing pool for a database replica based on at least one of a client address, a geographical location, a client priority, and a type associated with the received request.

22. The non-transitory machine readable medium of claim 17, wherein the number of incoming connections from the plurality of clients assigned to the queuing pools is greater than the number of outgoing connections from the queuing pools to the plurality of databases.

23. The non-transitory machine readable medium of claim 17, wherein the set of instructions for forwarding the stored requests through two concurrent outgoing connections to the particular database for processing comprises sets of instructions for:
 determining that the particular queuing pool has no outgoing connection available;
 waiting until an outgoing connection is available; and
 forwarding the stored requests through the available outgoing connection.

* * * * *